US005098976A

United States Patent [19]

Uryu et al.

[11] Patent Number: 5,098,976

[45] Date of Patent: Mar. 24, 1992

[54] ACOUSTIC MATERIAL

[75] Inventors: Masaru Uryu, Chiba; Yoshio Nishi, Kanagawa; Kazuo Yagi, Hiroshima, all of Japan

[73] Assignees: Sony Corporation; Mutsui Petrochemical Industries, Tokyo, both of Japan

[21] Appl. No.: 345,550

[22] PCT Filed: Aug. 22, 1988

[86] PCT No.: PCT/JP88/00836

§ 371 Date: Apr. 14, 1989

§ 102(e) Date: Apr. 14, 1989

[87] PCT Pub. No.: WO89/02207

PCT Pub. Date: Mar. 9, 1989

[51] Int. Cl.$^5$ ........................ C08F 110/02; C08F 7/00

[52] U.S. Cl. ................................ 526/348.1; 526/352; 427/40; 381/184; 381/202

[58] Field of Search ..................... 526/352, 348.1, 352; 428/294; 427/40, 41; 381/184, 202

[56] References Cited

U.S. PATENT DOCUMENTS

| | | | |
|---|---|---|---|
| 4,338,420 | 7/1982 | Arbit | 528/483 |
| 4,606,930 | 8/1986 | Ueno et al. | 427/40 |
| 4,879,076 | 11/1989 | Sano et al. | 526/352 |

FOREIGN PATENT DOCUMENTS

| | | |
|---|---|---|
| 110396 | 11/1985 | Japan . |
| 157500 | 7/1987 | Japan . |

*Primary Examiner*—Joseph L. Schofer
*Assistant Examiner*—Tom Weber
*Attorney, Agent, or Firm*—Hill, Van Santen, Steadman & Simpson

[57] ABSTRACT

This invention provides an acoustic material having high elastic modulus and large internal loss by subjecting a high-modulus stretched polyethylene containing paraffin wax to plasma treatment. When the acoustic material of the present invention is used for a diaphragm of a speaker, for example, it is possible to suppress the fluctuation of frequency characteristics resulting from split vibration, decrease harmonic distortion and improve transient characteristics.

9 Claims, 2 Drawing Sheets

ACOUSTIC MATERIAL

TECHNICAL FIELD

This invention relates to an acoustic material employed as the diaphragm for a loudspeaker and more particularly to an arrangement for improving internal losses in the acoustic material consisting essentially of the drawn polyethylene having a high modulus of elasticity.

BACKGROUND OF ART

The acoustic material employed in the diaphragm of a loudspeaker is required to have low density, high modulus of elasticity and hence a high rate of propagation of longitudinal waves and large internal losses, for enhancing the reproduction frequency range. With this in view, evolution towards industrial application of a so-called composite diaphragm is now underway using a variety of fibers such as carbon-, aramide-, glass- or polyolefin resin fibers as the reinforcing materials.

Above all, drawn high elastic modulus polyethylene, prepared by a crystal surface growth method, gel spinning-ultradrawing method or a melt draw orientation method is thought to be suitable as the acoustic material, in that it has a lower density and a higher rate of propagation of longitudinal waves. For example, it is shown in the Japanese Patent Publication KOKAI No - 182994/1983 to use polyethylene fibers having the rate of propagation of the longitudinal waves not lower than 4000 m/sec as the acoustic material It is noted that the aforementioned high elastic modulus polyethylene fibers compare favorably with aluminum in elastic modulus (Young's modulus), but are inferior to polyester in internal losses (tan δ), as shown in Table 1 indicating the physical properties thereof, such that it cannot be used directly as the acoustic material, above all, as the loudspeaker diaphragm.

TABLE 1

| | | tanδ | Young's modulus | method of preparation |
|---|---|---|---|---|
| polyethylene | a | 0.013 | 47 | fibrilated crystal |
| fibers | b | 0.011 | 82 | growth, gel spinning- |
| | c | 0.014 | 78 | ultra drawing, or melt spinning orientation |
| aluminum | | 0.008 | 73 | — |
| polyester | | 0.053 | 5 | biaxially drawn film |

The present invention has been made in view of the above described deficiencies of the prior art and is aimed to provide an acoustic material which is improved in internal losses without impairing the high modulus of elasticity proper to the drawn high elastic modulus polyethylene and which is relatively free from higher harmonic distortion or from fluctuations in the frequency response, that is, crests and valleys, caused by split vibrations, when the acoustic material is used as the diaphragm material.

DISCLOSURE OF THE INVENTION

As a result of our eager and perseverant investigations towards improving the internal losses of the drawn high elastic modulus polyethylene, the present inventors have found that it is most effective to process drawn high elastic modulus polyethylene containing paraffin wax as the damping agent with plasma.

On the basis of this finding, the present invention provides an acoustic material which is characterized in that drawn high elastic modulus polyethylene containing 1 to 5 wt. % of paraffin wax obtained by, for example, melt draw orientation, is processed with plasma, and in that at least a portion of paraffin wax contained in said drawn high elastic modulas polyethylene is not extracted with boiling n-hexane.

The drawn polyethylene, a main constituent of the acoustic material of the present invention, is prepared by medium to low pressure polymerization of ethylene either singly or with a minor quantity of other α-olefins, such as propylene, 1-butene, 4-methyl-1-pentene or 1-hexene. It has higher modulus of elasticity, such as the initial tensile elastic modulus not less than 30 GPa and preferably not less than 50 GPa and fracture elongation not higher than 6% and preferably not higher than 4%, thanks to the high degree of orientation of the polyethylene molecular chain brought about by ultra drawing. Above all the drawn polyethylene prepared from ultra high molecular weight polyethylene having an intrinsic viscosity (η) in a decalin solvent at 135° C. of not lower than 5 dl/g and preferably 7 to 30 dl/g, is obviously preferred since it is superior in tensile elastic modulus retention and in tensile strength retention at higher temperatures.

Since the drawn polyethylene as mentioned hereinabove is required to contain paraffin wax therein, it is preferably prepared by the so-called melt draw orientation method. This method is described for example in the Japanese Patent Publication KOKAI No. 187614/84 and includes the steps of melting and kneading a mixture of the aforementioned high molecular weight polyethylene and paraffin wax by a screw extruder at a temperature of 190° to 280° C., extruding the undrawn material from a die maintained at 210° to 300° C., drafting the material at a draft ratio at least above unity, cooling and solidifying the material and drawing the cooled and solidified material at a temperature of 60° to 140° at a draw ratio not less than three.

The paraffin wax employed mainly contains saturated aliphatic hydrocarbons having preferably the molecular weight of not higher than 2000 and the melting point of the order of 40° to 120° C. More specifically, the paraffin wax may include n-alkanes having 22 or more carbon atoms, such as docosane, tricosane, tetracosane or triacontane, a mixture containing these n-alkanes as main component and lower n-alkanes, paraffin wax separated and refined from petroleum, low to medium pressure polymerized polyethylene wax, high pressure polymerized polyethylene wax, or ethylene copolymer wax which is a low molecular weight polymer of ethylene, either singly or as a copolymer with other α-olefins, low molecular weight wax obtained from polyethylene such as medium to low pressure polymerized polyethylene and high pressure polymerized polyethylene by thermal degradation, oxides of these waxes and modified products of these waxes by maleic acid.

At least a portion of the aforementioned paraffin wax is contained in the aforementioned drawn polyethylene and plays the role of a damping agent by physicochemical processing, viz. the plasma processing.

The method of plasma processing consists in effecting glow discharge in plasma gas in the presence of an organic compound, herein a paraffin wax, to produce an excited compound and either having the excited compound contained in the drawn polyethylene after the modification of the compound or polymerizing the excited compound with the drawn polyethylene. In the plasma processing, the impressed voltage and the gas pressure may be preset in the usual ranges and it does not matter what kind of the plasma is to be employed.

This plasma processing will result in improved surface properties, adhesiveness in particular, of the drawn polyethylene, and is most advantageous when, for example, the polyethylene is conjugated with other materials to produce an acoustic material.

It is preferred that the amount of the paraffin wax remaining in the drawn polyethylene after the plasma processing be in the range from 1 to 5 wt. %. With the amount of the residual paraffin wax less than 1 wt. %, the damping effect is insufficient. With the amount in excess of 5 wt. %, the Young's modulus is undesirably lowered.

The paraffin wax is dissolved in the drawn polyethylene prepared by, for example, the melt draw orientation method. When the drawn polyethylene is subjected to plasma processing, the wax plays the role of the damping agent to increase the internal losses.

At this time, the drawn polyethylene itself is not lowered in the physical properties but the higher rate of propagation of the longitudinal waves is maintained with the high modulus of elasticity and low density.

It should be noticed that not all of the paraffin wax remaining in the drawn product is modified or polymerized with the drawn polyethylene. It is inferred that modification or polymerization occurs only in the region of 10 to 30 Å from the surface of the drawn polyethylene, with the wax deep within the drawn product remaining intact without undergoing any reaction. It is noted that the surface of the drawn polyethylene in which the paraffin wax is modified and caused to remain or polymerized has a densely packed structure, so that there is no opportunity for the wax remaining deep in the drawn product to be deposited on the surface of the product.

Therefore, when the acoustic material of the present invention is used in, for example, a diaphragm for a loudspeaker, it becomes possible to suppress fluctuations in the frequency response brought about by split vibrations, while reducing the distortion due to secondary harmonics and improving transient characteristics.

PREFERRED EMBODIMENT TO PRACTICE THE INVENTION

Figure 1:
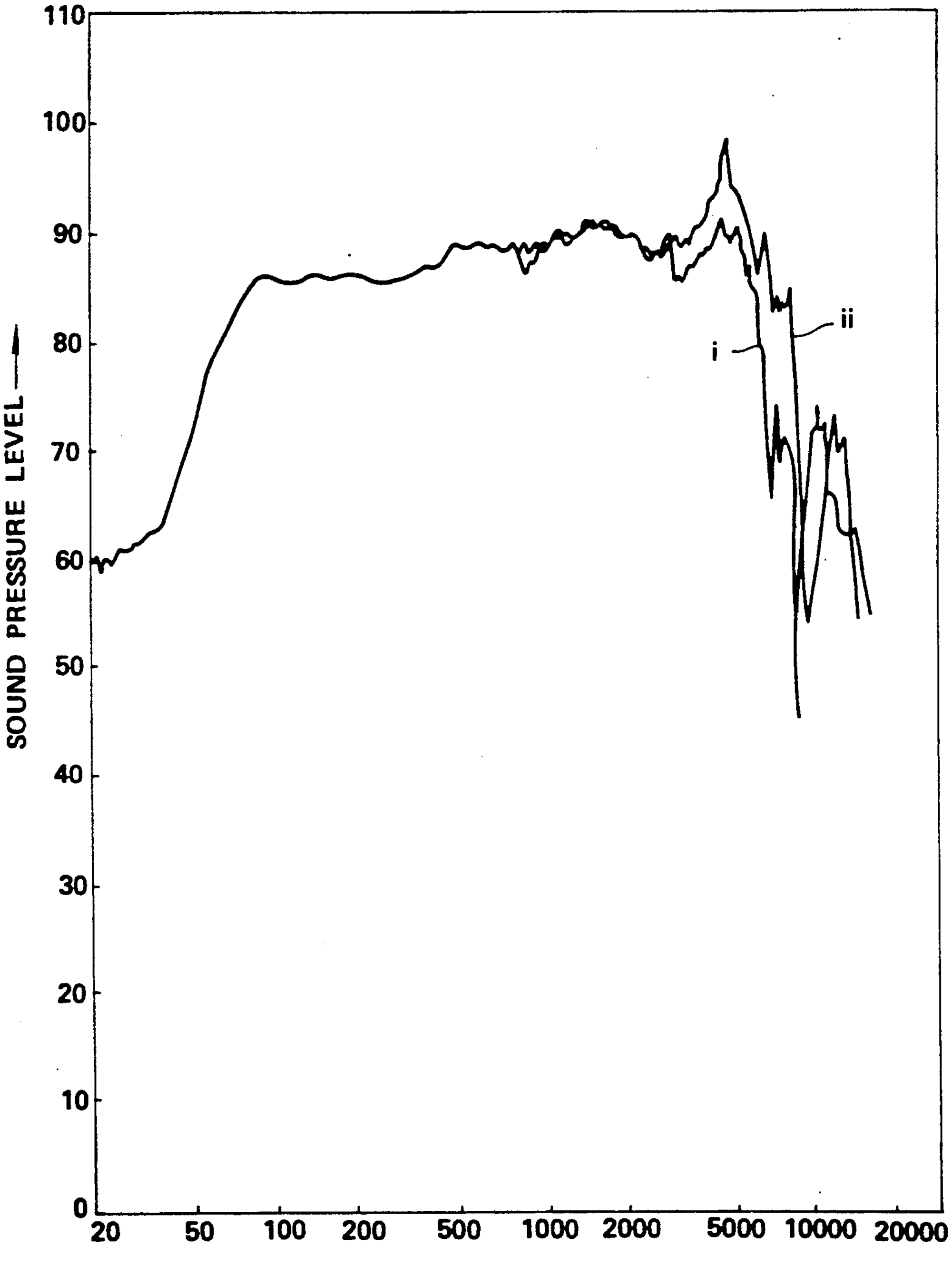
FIG. 1 is a characteristic diagram indicating the difference in the reproduction frequency response of the diaphragm caused by the presence or absence of the plasma processing treatment of the high elastic modulus polyethylene fibers containing paraffin wax.

The present invention will be explained on the basis of concrete test results

Preparation of Polyethylene Fibers

A 25:75 blend of an ultra high molecular weight polyethylene having a intrinsic viscosity $\eta$ in the decalin solvent at 135° C. equal to 8.20 dl/g and a paraffin wax having a melting point of 60° C. and a molecular weight of 460 was melt-spun and drawn under the following conditions.

Thus the powders of the ultra high molecular weight polyethylene and pulverized paraffin wax were mixed, melted and kneaded together at a resin temperature of 190° C. using a screw extruder 20 mm in diameter and a L/D ratio equals to 20. The melted product was then extruded through a die having an orifice diameter of 1 mm and solidified with cold water of 20° C. at an air gap of 10 cm. The drafting was performed at this time so that the diameter of the cooled and solidified fiber or filament be 0.50 mm, that is, with a draft ratio equal to two. The term drafting herein means the drawing of the melted product while it is extruded from the screw extruder in the molten state, while the term draft ratio means the ratio of the die orifice diameter to the diameter of the cooled and solidified fiber or filament.

Then, using a pair of godet rolls, drafting was continuously performed in a drafting vessel containing n-decane as the heat medium, with the temperature in the vessel equal to 130° C. and the vessel length equal to 40 cm.

The drawn product was then processed with n-hexane and the amount of the remaining paraffin wax was controlled.

Ascertainment of Immobilization of Paraffin Wax by Plasma Processing

In accordance with the above process, polyethylene fibers (samples 1 and 2) containing 6 wt. % and 2.5 wt. % of paraffin wax, respectively, were prepared and immobilization of a portion of a paraffin wax caused by plasma processing was ascertained from the amounts of extraction by n-hexane before and after the plasma processing.

The plasma processing was performed under conditions of an argon plasma gas pressure of 0.04 Torr, 100 mA and 240 V.

Paraffin wax was extracted with n-hexane for 24 hours using a Soxhlet's extractor.

The residual amounts of paraffin wax remaining before and after plasma processing are shown in Table 2.

TABLE 2

| | amount of extraction before plasma processing (wt. %) | amount of extraction after plasma processing (wt. %) | residual wax in filament |
|---|---|---|---|
| sample 1 | 6.0 | 2.6 | 3.4 |
| sample 2 | 2.5 | 1.2 | 1.3 |

It is seen from the Table 2 that the wax not extracted with n-hexane after plasma polymerization remains in the filament in an amount of about 50%. Thus it has been demonstrated that a portion of the wax has become immobilized on the polyethylene fibers by the plasma processing.

Ascertainment of the Damping Effect

Using polyethylene fibers previously subjected to plasma processing (samples 1 and 2) and polyethylene fibers (reference sample) not subjected to plasma processing, unidirectional conjugation was performed with an epoxy resin, and the physical properties of the conjugate or composite material were measured and compared by the vibration reed method. The following conjugating conditions were adopted.

Conjugating conditions

Polyethylene fibers: 1000 deniers; 200 filaments epoxy resin: YD 128 by Toto Kasei KK hardener: 2E4MZ by Shikoku Kasei KK The results are shown in Table 3.

TABLE 3

| | paraffin wax content (wt. %) | tanδ | Young's modulus (GPa) | vol. percent. of fibers in the conjug. mat. |
|---|---|---|---|---|
| Sample 1 | 3.4 | 0.038 | 50.3 | 0.63 |
| Sample 2 | 1.3 | 0.026 | 73.2 | 0.65 |
| reference sample | 0 | 0.017 | 70.4 | 0.63 |

It is confirmed from this Table that the composite fiber material to which the present invention is applied (samples 1 and 2) has larger internal losses (tan δ) such that it is sufficiently suited as the acoustic material, especially the diaphragm material. It is noted that, since the present invention is aimed to provide the acoustic material the effects of the fibers were checked by evaluating the composite material instead of evaluating the polyethylene fibers or filaments per se.

Evaluation as the Diaphragm

Using polyethylene fibers previously processed with plasma (sample 2) and polyethylene fibers not processed with plasma (reference sample), a diaphragm for a full range speaker unit, 16 cm in diameter, was prepared under the following conjugating conditions, and the reproduction frequency response as well as the frequency response for the second harmonic distortion was measured.

Conjugating Conditions polyethylene fibers: 1000 deniers; 200 filaments (used as the flat woven fabric of 150 g/m$^2$)

epoxy resin: YD 128, by Toto Kasei KK hardener: 2E4MZ, by Shikoku Kasei KK

Figure 2:
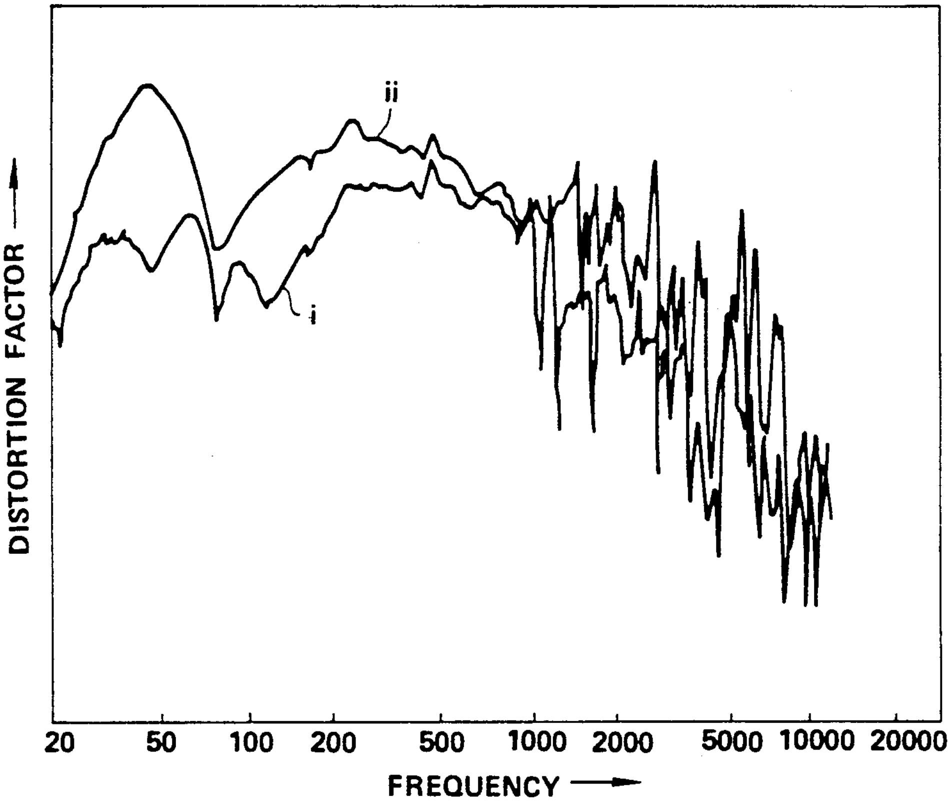
FIG. 2 is a characteristic diagram showing the difference in the frequency response of the distortion by second order harmonics.

The results are shown in FIGS. 1 and 2. In these figures, line i indicates the characteristics of the diaphragm prepared with the polyethylene fibers subjected to plasma polymerization and line ii indicates those of the diaphragm prepared with the polyethylene fibers not subjected to plasma polymerization.

As a result, it has been shown that the diaphragm prepared with the polyethylene fibers subjected to plasma processing exhibits a peak in the high limit reproduction frequency which is lower than that of the diaphragm prepared with the polyethylene fibers not subjected to plasma processing, while undergoing lesser distortion due to secondary harmonics in the overall range so that there are obtained characteristics reflecting the effects of the acoustic material of the present invention.

We claim:

1. An acoustic material consisting essentially of drawn high elastic modulus, polyethylene including a paraffin wax and being subjected to an electrical plasma surface treatment.

2. An acoustic material consisting essentially of drawn high elastic modulus polyethylene containing 1 to 5 wt. % of paraffin wax and said polyethylene having the surface thereof being processed with an electrical plasma surface treatment.

3. An acoustic material according to claim 2, wherein at least a portion of the paraffin wax is caused to remain in the drawn high elastic modulus polyethylene after extraction with boiling n-hexane.

4. An acoustic material according to claims 2 or 3, wherein the paraffin wax is at least one of n-alkane, paraffin wax, polyethylene wax, oxidized wax, and maleic acid modified wax.

5. An acoustic material according to any one of claims 1 to 3, wherein the drawn elastic modulus polyethylene has the initial tensile elastic modulus of not less than 30 GPa and the fracture elongation of not higher than 6%.

6. An acoustic material according to any one of claims 1 to 3, wherein the drawn high elastic modulus polyethylene is a drawn product of high molecular weight polyethylene having a intrinsic viscosity in a decalin solution at 135° C. of not less than 5 dl/g.

7. An acoustic material according to any one of claims 1 to 3, wherein the drawn high elastic modulus polyethylene is prepared by a melt draw orientation process.

8. An acoustic material comprising drawn high elastic modulus polyethylene including paraffin wax, at least a portion of the paraffin wax remains after extraction with hexane, the material being subjected to an electrical plasma surface treatment.

9. An acoustic material according to claims 2 or 3, wherein the paraffin wax contains saturated aliphatic hydrocarbons having a molecular weight that is not greater than 2000 and a melting point ranging from 40° C. to 120° C.

* * * * *